United States Patent
Chritz

(10) Patent No.: US 10,511,353 B2
(45) Date of Patent: Dec. 17, 2019

(54) SYSTEM FOR OPTIMIZING ROUTING OF COMMUNICATION BETWEEN DEVICES AND RESOURCE REALLOCATION IN A NETWORK

(71) Applicant: MICRON TECHNOLOGY, INC., Boise, ID (US)

(72) Inventor: Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 14 days.

(21) Appl. No.: 15/726,281

(22) Filed: Oct. 5, 2017

(65) Prior Publication Data

US 2019/0020382 A1    Jan. 17, 2019

Related U.S. Application Data

(63) Continuation-in-part of application No. 15/647,676, filed on Jul. 12, 2017.

(51) Int. Cl.
*H04B 7/04* (2017.01)
*H04W 28/18* (2009.01)
(Continued)

(52) U.S. Cl.
CPC .............. *H04B 7/04* (2013.01); *H04B 7/0413* (2013.01); *H04W 28/0231* (2013.01);
(Continued)

(58) Field of Classification Search
CPC .......... H04B 7/04; H04L 47/24; H04W 28/18; H04W 72/04; H04W 28/08; H04W 28/0231; H04W 16/28; H04W 48/00
See application file for complete search history.

(56) References Cited

U.S. PATENT DOCUMENTS 7,328,270 B1    2/2008   Reents et al.
8,472,372 B1 *  6/2013   Dulai .................... G06F 3/1205
                                                                358/1.15
(Continued)

FOREIGN PATENT DOCUMENTS

WO    2016197004 A2    12/2016
WO    2019014383 A1     1/2019

OTHER PUBLICATIONS

U.S. Appl. No. 15/647,676, entitled "System for Optimizing Routing of Communication Between Devices and Resource Reallocation in a Network", filed Jul. 12, 2017, pp. all.
(Continued)

*Primary Examiner* — Peter P Chau
(74) *Attorney, Agent, or Firm* — Dorsey & Whitney LLP

(57) ABSTRACT

Methods, systems, and devices for signal processing and wireless communication are described. For example, a device may include a plurality of antennas operable to transmit and receive communication packets via a plurality of communication protocols and an integrated circuit chip coupled to the plurality of antennas. The integrated circuit chip may comprise a first and a second plurality of processing elements. The first plurality of processing elements may be operable to receive communication packets via a first one of a plurality of communication protocols and process an optimal route. The second plurality of processing elements may be communicatively coupled to the first plurality of processing elements and operable to determine the optimal route to transmit the communication packets from a source device to a destination device based, at least in part, on transmission characteristics associated with at least one of the source or destination devices.

10 Claims, 10 Drawing Sheets

(51) Int. Cl.
*H04W 28/02* (2009.01)
*H04W 72/04* (2009.01)
*H04W 28/08* (2009.01)
*H04B 7/0413* (2017.01)
*H04W 16/28* (2009.01)
*H04L 12/851* (2013.01)

(52) U.S. Cl.
CPC ........... *H04W 28/08* (2013.01); *H04W 28/18* (2013.01); *H04W 72/04* (2013.01); *H04L 47/24* (2013.01); *H04W 16/28* (2013.01)

(56) References Cited

U.S. PATENT DOCUMENTS

| | | | |
|---|---|---|---|
| 8,811,422 B2 | 8/2014 | Georgiou et al. | |
| 2002/0035633 A1* | 3/2002 | Bose | H04B 1/0007 709/230 |
| 2003/0067894 A1* | 4/2003 | Schmidt | H04W 88/06 370/329 |
| 2004/0071164 A1 | 4/2004 | Baum | |
| 2004/0252643 A1 | 12/2004 | Joshi | |
| 2006/0098608 A1 | 5/2006 | Joshi | |
| 2007/0195768 A1 | 8/2007 | Kanazawa et al. | |
| 2010/0027418 A1* | 2/2010 | Rodrig | H04L 41/147 370/235 |
| 2010/0100934 A1 | 4/2010 | Mejdrich et al. | |
| 2011/0138259 A1* | 6/2011 | Tan | H03M 13/41 714/792 |
| 2012/0082171 A1 | 4/2012 | Georgiou et al. | |
| 2014/0213256 A1 | 7/2014 | Meylan et al. | |
| 2016/0021627 A1 | 1/2016 | Etkin et al. | |
| 2016/0066788 A1 | 3/2016 | Tran et al. | |
| 2016/0119775 A1 | 4/2016 | Karaoguz | |
| 2016/0150459 A1 | 5/2016 | Patil et al. | |
| 2017/0201927 A1* | 7/2017 | Kobayashi | H04W 4/80 |
| 2018/0007042 A1* | 1/2018 | Weizman | H04L 63/0861 |
| 2019/0020383 A1 | 1/2019 | Chritz | |
| 2019/0020581 A1 | 1/2019 | Chritz et al. | |

OTHER PUBLICATIONS

PCT Application No. PCT/US2018/041695, titled "System for Optimizing Routing of Communication Between Devices and Resource Reallocation in a Network" filed on Jul. 11, 2018, pp. all.

U.S. Appl. No. 16/107,796 titled "System for Optimizing Routing of Communication Between Devices and Resource Reallocation in a Network", filed Aug. 21, 2018, pp. all.

U.S. Appl. No. 16/671,111 titled "System for Optimizing Routing of Communication Between Devices and Resource Reallocation in a Network" filed Oct. 31, 2019, pp. all.

* cited by examiner

US 10,511,353 B2

SYSTEM FOR OPTIMIZING ROUTING OF COMMUNICATION BETWEEN DEVICES AND RESOURCE REALLOCATION IN A NETWORK

CROSS REFERENCE TO RELATED APPLICATION(S)

This application is a Continuation-in-Part of pending U.S. patent application Ser. No. 15/647,676 filed Jul. 12, 2017, which application is incorporated herein by reference, in its entirety, for any purpose.

TECHNICAL FIELD

Examples described herein generally relate to optimizing routing of communication between devices and reallocation of processing resources in a network based on resource availability, and in particular based on prediction of resource availability.

BACKGROUND OF THE DISCLOSURE

The use of mobile communication devices, such as mobile phones (e.g., smart phones), tablets, and laptops while on-the-go has become a ubiquitous routine in society. As the adaptation of on-the-go communication practice becomes more widespread, limitations on the communication systems are becoming apparent. For example, during peak communication hours where there is increased communication traffic, a cellular network might experience sluggishness due to an overly leveraged communication system or communication across a WiFi hotspot zone may experience significant delays.

As such, it is desirable to have a system and method that optimizes routing of communication packets or signals between mobile devices in a manner that avoids communication sluggishness across a network.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION

Examples disclosed herein may recognize that a single chip solution for processing communications signals provides reduced power consumption and a smaller physical footprint, which may make a single chip solution preferable in mobile and/or wireless systems, such as smartphones. Moreover, such single chip solutions may provide increased versatility by allowing for the dynamic allocation of processing elements to process communications signals. Such single chip solutions may also integrate traditional wireless communications bands (e.g., industrial, scientific, and medical radio band) with sub 1-GHz bands that many emerging Internet of Things (IoT) systems may utilize. Stated differently, the single chip solutions described herein are not limited to certain frequency bands like traditional systems (e.g., a smartphone being limited to 4G long-term evolution (LTE), WiFi, and/or Bluetooth®). Instead, examples of single-chip solutions described herein may integrate those communication technologies with transceivers for IoT systems, such as Z-Wave operating at 900 MHz; radio frequency identification (RFID) systems operating at any of 13.56 MHz, 433 MHz, or 902-928 MHz ranges; and/or even microwave frequencies at 3.1-10 GHz.

In various examples, a processing element with a reconfigurable fabric can be used to process different protocols, according to the demand of a wireless system or an IoT system. For example, hardware and power complexity may be reduced when utilizing the reconfigurable fabric space for baseband and digital front and processing for any type of analog processing system (e.g., different antennas for corresponding frequency bands). In contrast to conventional wireless transceivers and IoT reader systems, the processing capability of each of those receiver systems may be integrated into the reconfigurable fabric space that can be dynamically shifted for processing of signals from any analog processing system. In this shared reconfigurable fabric space application, processing for each receiver system may be allocated to a respective cluster(s) of processing elements. In such an example, the aggregate processing results of each receiver system can be processed in the shared, coherent memory space, before deciding whether to transmit an aggregated processing result via a specific transmitter. For example, using a shared reconfigurable fabric, a processing result derived from measurements of an IoT system and information from an LTE system can be transmitted via an RFID system, in some examples, utilizing the same processing element.

Figure 1:
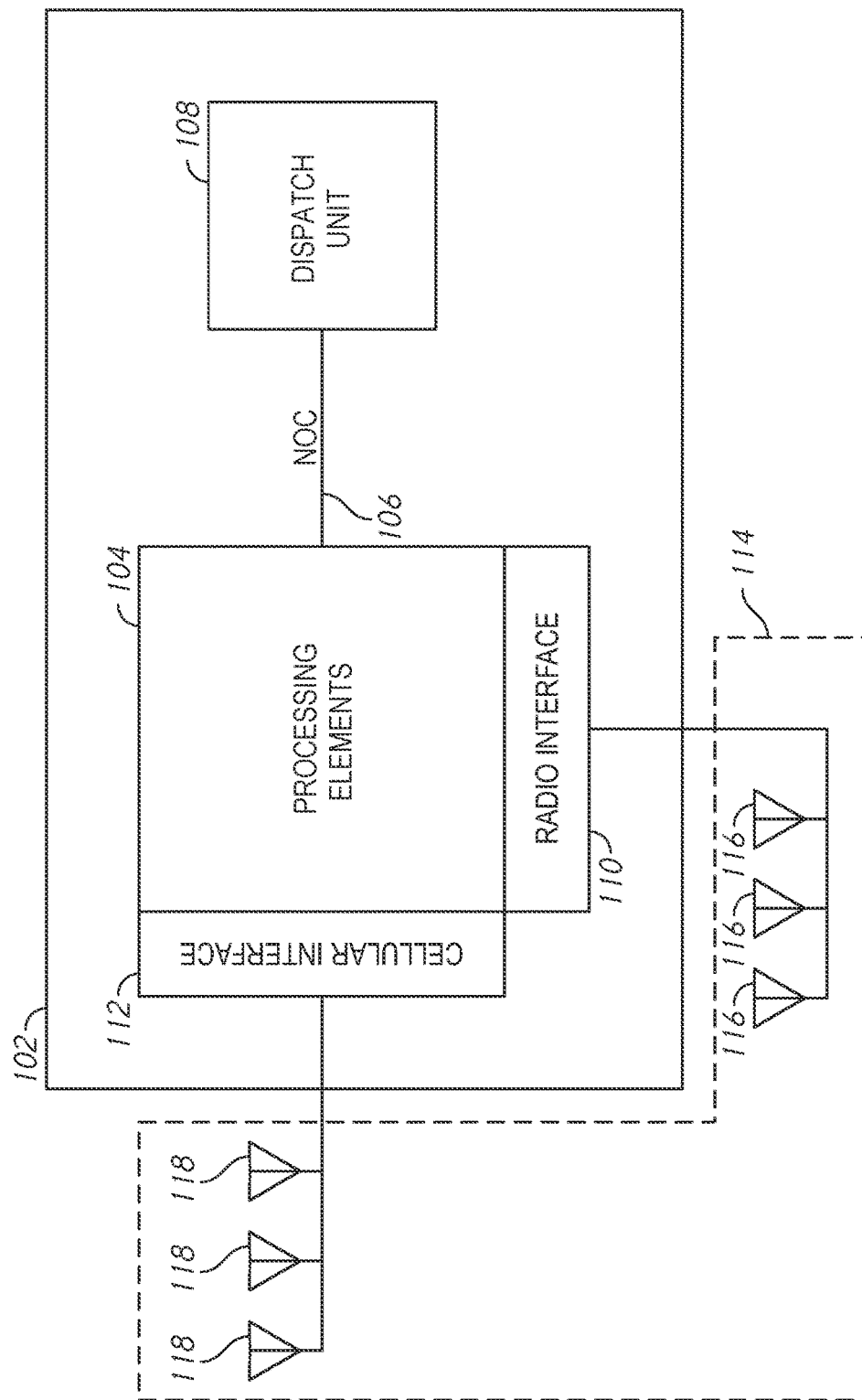
FIG. 1 is a block diagram of an integrated circuit chip, according to one illustrated example.

FIG. 1 is a block diagram of an integrated circuit chip 102, in accordance with an example of the present disclosure. The integrated circuit chip 102 is a single chip capable of processing communications signals. Examples of single chip systems include those where circuitry for performing the described tasks are fabricated on and/or into a common substrate generally using semiconductor fabrication techniques. The integrated circuit chip 102 includes a plurality of processing elements 104, a network on chip (NOC) 106, a dispatch unit 108, a radio interface 110, and a cellular interface 112. The integrated circuit chip 102 may be coupled to a plurality of antennas 114. The plurality of antennas 114 may include a first set of antennas 116 and a second set of antennas 118.

The processing elements 104 may be implemented using one or more processors, for example, having any number of cores. In some examples, the processing elements 104 may include circuitry, including custom circuitry, and/or firmware for performing functions described herein. For example, circuitry can include multiplication unit/accumulation units for performing the described functions, as described herein. Processing elements 104 can be any type including but not limited to a microprocessor or a digital signal processor (DSP), or any combination thereof. For example, processing elements 104 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof.

The NOC 106 may be implemented as an on-chip communications sub-system configured to facilitate communication between the processing elements 104 and the dispatch unit 108. The NOC 106 may include, for example, one or more links, such as copper wires, connecting the processing elements 104 and the dispatch unit 108 and configured to carry information from the processing elements 104 to the dispatch unit 108 and vice versa.

The dispatch unit 108 may include instructions sets (e.g., one or more program instructions or operations) to be performed by the processing elements 104. The dispatch unit may include, for example, computer software, hardware, firmware, or a combination thereof configured to provide instruction sets from a storage device to the processing elements 104. For example, the instruction sets may include instructions to perform certain logic or arithmetic operations on data, transmit data from one processing element 104 to another processing element 104, or perform other operations. In some examples, a first processing element instruction set may be loaded onto a first processing element 104 and include instructions for a processing element to receive a signal of a first type (e.g., a signal associated with a received radio signal), to process the received signal of a first type to generate a set of data, and to transmit the set of data to a second processing element 104. A second processing element instruction set may be loaded onto a second processing element 104 and be configured to receive the set of data, process the set of data to generate a second signal of a second type and to transmit the second signal with a plurality of antennas. The dispatch unit 108 may retrieve instructions for the processing elements 104 from one or more memories, such as a volatile (e.g., dynamic random access memory (DRAM)) or non-volatile memory (e.g., Flash memory). The processing element instruction sets may be stored in one or more data structures, such as a database.

The radio interface 110 may be coupled to the plurality of antennas 114 and to one or more of the processing elements 104. The radio interface 110 may be configured to receive radio signals detected by the plurality of antennas 114 and convert the received signals into a signal that can be manipulated by the one or more processing elements 104 and route the resulting signal to the one or more processing elements. In some examples, radio interface 110 may include an analog to digital converter. In other examples, the radio interface 110 may include additional or different components, circuits, etc. Although described as a "radio interface," in some examples, the interface may generally be adapted to convert a received signal of any type to a signal that can be manipulated by the processing elements 104. For example, the radio interface 110 may be configured to receive Wi-Fi signals, optical signals, auditory signals, or any other type of signals. In some examples, the radio interface 110 is configured to receive RFID signals detected by the plurality of antennas 114 and to provide the received signals to the one or more processing elements 104.

The cellular interface 112 may be coupled to the plurality of antennas 114 and to one or more of the processing elements 104. The cellular interface 112 may be configured to transmit/receive cellular signals with the plurality of antennas 114 and convert the signals between a signal that can be manipulated by the one or more processing elements 104 and a signal that can be transmitted using the plurality of antennas 114. In some examples, cellular interface 112 may include a digital to analog converter. In other examples, the cellular interface 112 may include additional or different components, circuits, etc. Although described as a "cellular interface," in some examples, the interface may generally be adapted to any type of signal. A cellular signal may generally refer to any protocol of cellular signal, such as 3G, 4G, 4G LTE, 5G, etc. The cellular interface 112 may be configured to transmit Wi-Fi signals, optical signals, auditory signals, or any other type of signals. In some examples, the cellular interface 112 is configured to transmit a different type of signal than the radio interface 110.

The plurality of antennas 114 is configured to receive and transmit wireless signals. The plurality of antennas 114 may generally be any type of antennas, such as a wire antenna (e.g., a dipole antenna, a loop antenna, a monopole antenna, a helix antenna, etc.), an aperture antenna (e.g., a waveguide, a horn antenna, etc.), a reflector antenna (e.g., a parabolic reflector, a corner reflector, etc.), a lens antenna (e.g., a convex-plane, a concave-plane, a convex-convex, or a concave-concave), a microstrip antenna (e.g., a circular shaped, rectangular shaped, metallic patch, etc.), an array antenna (e.g., a Yagi-Uda antenna, a micro strip patch array, an aperture array, a slotted wave guide array, etc.), or combinations thereof.

In the example of FIG. 1, the plurality of antennas 114 includes a first subset of antennas 116 configured to receive radio signals and to communicate the received signals to the radio interface 110. The plurality of antennas 114 further includes a second subset of antennas 118 configured to communicate over a cellular network. The second subset of antennas 118 may receive signals from the cellular interface 112 and transmit the received signals to one or more cellular nodes (not shown), such as a cellular tower. In various examples, the plurality of antennas 114 may be configurable. For example, antennas in the plurality of antennas 114 may be adjustable to receive and/or transmit signals of different types. In such examples, the first subset of antennas 116 and the second subset of antennas 118 may be the same antennas. For example, the first subset of antennas 116 may be configured to receive radio signals, such as an RFID signal and to communicate the received radio signal to the processing elements 104 via the radio interface 110. The first subset of antennas 116 may be reconfigured to communicate using a cellular network as the second subset of antennas 118. For example, the plurality of antennas 118 may include or be coupled to an integrated inner mechanism, such as RF switches, varactors, mechanical actuators, or tunable materials, that enable the intentional redistribution of currents over the surface of the antenna to produce modifications of its properties. The processing elements 104 may process the received radio signals according to the instruction sets fetched by the dispatch unit 108 and communicate a resulting cellular signal to the second subset of antennas 118 via the cellular interface 112. The second subset of antennas 118 may then communicate the received signals via a cellular network.

Figure 2:
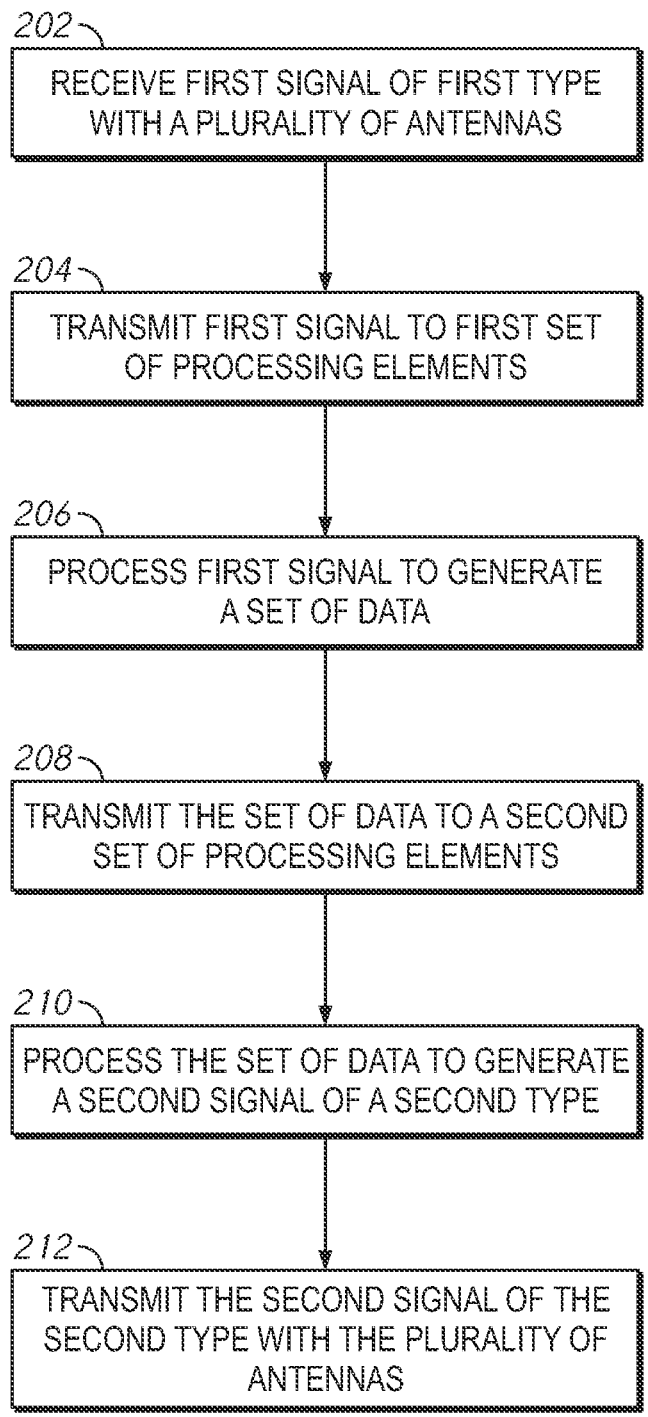
FIG. 2 is a flowchart illustrating a method for processing signals with a single integrated circuit chip, according to one illustrated example.

FIG. 2 is a flowchart illustrating a method of processing signals with a single integrated circuit chip, in accordance with an example of the present disclosure.

In operation 202, a first signal of a first type is received with a plurality of antennas. The signal may be received, for example, with the plurality of antennas 114, and specifically with the first subset of antennas 116. In various examples, the first signal of the first type may be a radio signal associated with an RFID device. The first subset of antennas 114 may employ beam forming to detect one or more first signals of the first type. Beamforming is a signal processing technique that enables directional signal transmission or reception. Beamforming typically uses a phased antenna array in such a way that signals at particular angles experience constructive interference while signals at other angles experience destructive interference.

In operation 204, the first signal of the first type is provided to a first set of processing elements. For example, the first subset of antennas 116 may provide the received first signal of the first type to one or more of the processing elements 104 via the radio interface 110. The particular processing element(s) 104 to which the first signal of the first type is provided may be determined, for example, by the instructions sets provided by the dispatch unit 108.

In operation 206, the first signal of the first type is processed to generate a set of data. For example, the one or more processing elements 104 may process the received first signal to generate a particular set of data. The set of data may generally be any type of data. For example, the set of data may include location information for one or more devices that transmitted the first signal of the first type. In one example, an RFID device emits a radio signal. The radio signal is detected by the first subset of antennas 116. The one or more processing elements 104 may process the received signals based on known beamforming or interferometry properties of the first subset of antennas 116 to derive location information about the one or more RFID devices.

In operation 208, the set of data may be transmitted to a second set of processing elements. For example, the first set of processing elements 104 may transmit the set of data to a second set of processing elements 104. The particular processing elements 104 included in the second set may be identified by the processing element instruction set(s) being executed by the first set of processing elements 104. For example, the processing element instruction set may include address information for the second set of processing elements 104. Once the first set of processing elements 104 generates the set of data, the processing element instruction set may instruct the first set of processing elements 104 to transmit the set of data to a switch. The switch may then transmit the set of data to the second set of processing elements 104.

In operation 210, the set of data may be processed to generate a second signal of a second type. For example, the set of data may be formatted for transmission according to a communications protocol P corresponding to the second type of signal. The communications protocol P may, for example, be a cellular communications protocol $P_{cell}$, such as 3G, 4G, or 5G. In other examples, the communications protocol P may be Wi-Fi protocol $P_{WiFi}$, Bluetooth® protocol $P_{IoT}$, or any other type of communication protocol P.

In operation 212, the second signal of the second type is transmitted with the plurality of antennas. For example, the second set of processing elements 104 may transmit the second signal of the second type to the plurality of antennas 114 and specifically to the second subset of antennas 114 via the cellular interface 112. The second subset of antennas 118 may transmit the second signal of the second type to a cellular tower for example, or in the case of Wi-Fi, to a Wi-Fi node, such as a router.

Figure 3:
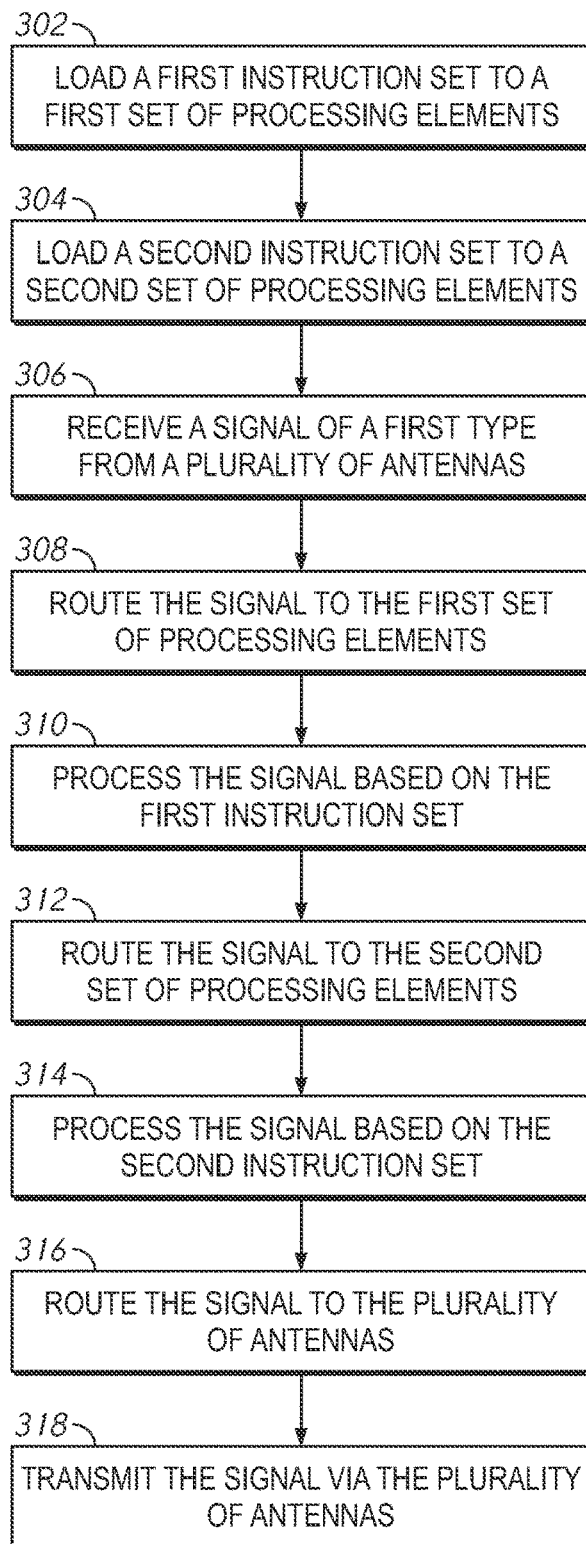
FIG. 3 is a flowchart illustrating a method for processing signals with a single integrated circuit chip, according to one illustrated example.

FIG. 3 is a flow chart illustrating a method of processing signals with a single integrated circuit chip, in accordance with an example of the present disclosure.

In operation 302, a first instruction set is loaded to a first set of processing elements. For example, an instruction set of the processing elements loaded by the dispatch unit 108 may be transferred to a first set of processing elements 104 via the NOC 106. The first set of processing elements 104 may process data according to the received first instruction set.

In operation 304, a second instruction set is loaded to a second set of processing elements. For example, an instruction set of the processing elements 104 loaded by the dispatch unit 108 may be transferred to a second set of the processing elements 104, different from the first set of processing elements 104 in operation 302, via the NOC 106. The second set of processing elements 104 may process data according to the received second instruction set. The second instruction set may generally include any types of instructions. In one example, the second instruction set includes instructions to convert received signals from a first format (e.g., signal type or communications protocol) to a second format. For example, the second instruction set may include instructions to convert a signal from an RFID format to a format that can be communicated via cellular or WiFi network.

In operation 306, a signal of a first type is received from a plurality of antennas. For example, the plurality of antennas 114 may detect one or more signals of a first type, such as a radio frequency signal (e.g., and RFID signal). In one example, the signal of the first type may be received by the first set of antennas 116.

In operation 308, the signal of the first type is routed to the first set of processing elements. For example, the plurality of antennas 114 may transfer the received signal of the first type to the radio interface 110. The radio interface 110 may transfer the signal of the first type to the first set of processing elements. As discussed above, the radio interface 110 may include various circuits, such as analog to digital converters, etc.

In operation 310, the signal of the first type is processed based on the first instruction set. For example, the first set of processing elements 104, into which the first instruction sets were loaded in operation 302, may process the received signal of the first type in accordance with the first instruction set. For example, the first instruction set may include processing instructions to determine a location of one or more sources of the signals of the first type. However, those skilled in the art will appreciate that any series of instructions may be executed by the first set of processing elements 104.

In operation 312, the processed signal is routed to a second set of processing elements. For example, the first instruction set loaded into the first set of processing elements 104 may include instructions to transfer the processed signal of the first type to the second set of processing elements 104 into which the second instruction set was loaded in operation 304. Specifically, the first set of processing elements 104 may transfer the processed signal to one or more switches along with an instruction to transmit the signal to the particular processing elements 104 executing the second instruction set. The one or more switches may then transfer the processed signal to the second set of processing elements 104.

In operation 314, the signal is processed based on the second instruction set. For example, the second set of processing elements 104, into which the second instruction set was loaded in operation 304, may process signals received in operation 312 to generate signals of a second type. As a specific example, the second set of processing elements may convert received signals into a format that can be transmitted via a cellular network or a WiFi network. Such processing may include, for example, converting the received signals into data packets of information for transmission.

In operation 316, the signal is routed to the plurality of antennas. For example, the second set of processing elements 104 may transmit the processed signal to the cellular interface 112. As discussed above, the cellular interface 112 may include various circuits, such as an analog to digital converter. The cellular interface 112 may provide the signal of the second type to the plurality of antennas 114. In a specific example, the cellular interface 112 may provide the signal of the second type to the second set of antennas 118. In various examples, the second set of antennas 118 may be the same antennas as the first set of antennas 116 on which the signal of the first type was received in operation 306.

In operation 318, the signal of the second type is transmitted via the plurality of antennas.

Figure 4:
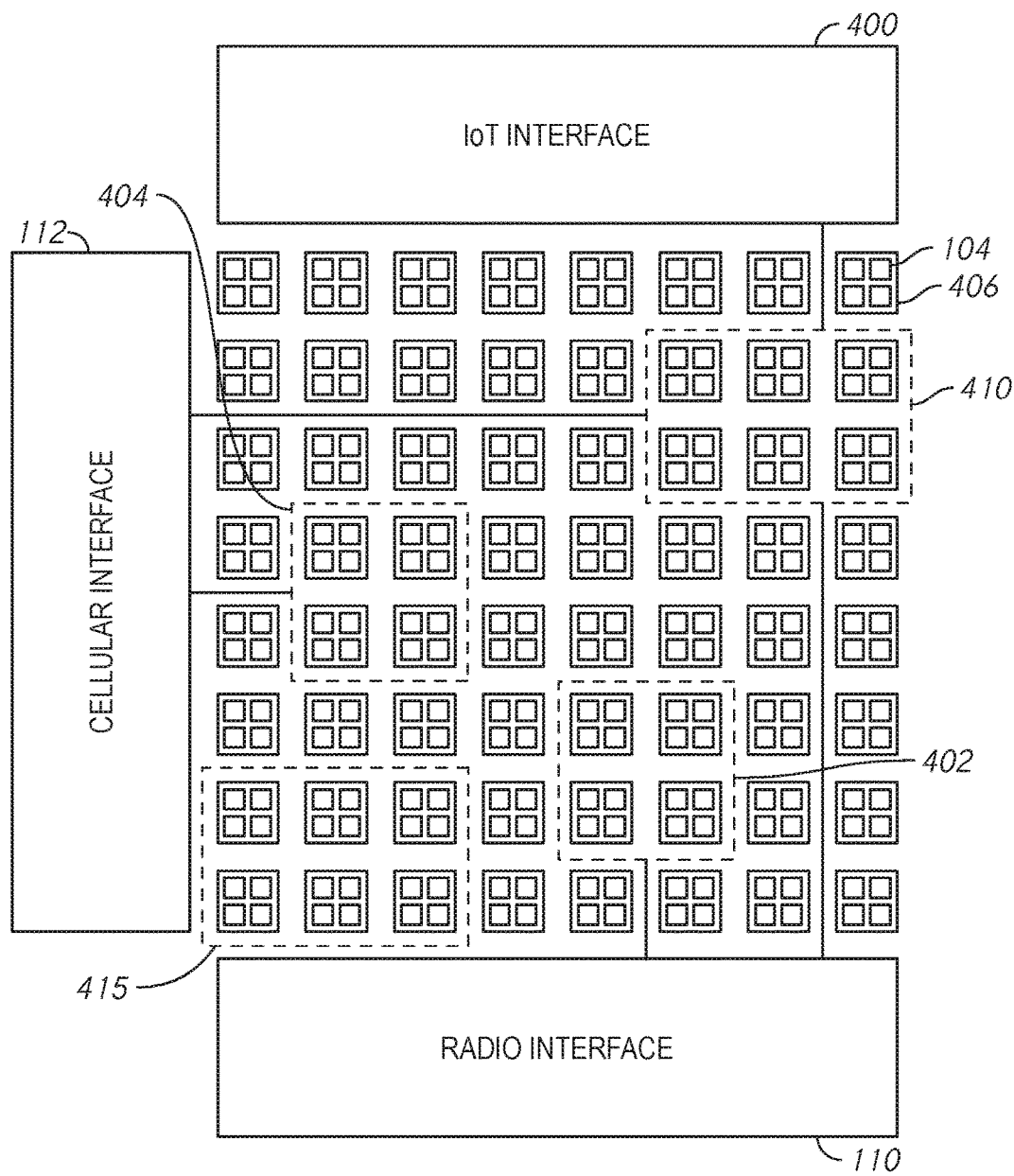
FIG. 4 is block diagram of plurality of processing elements and communication interfaces, according to one illustrated example.

FIG. 4 is a block diagram of plurality of clusters 406 of processing elements 104, a radio interface 110, a cellular interface 112, and an IoT interface 400, in accordance with an example of the present disclosure. The clusters 406 of processing elements 104, the radio interface 110, and the cellular interface 112 may be implemented as described above with respect to FIG. 1. Similarly to the radio and cellular interfaces 110, 112 described above, the IoT interface 400 may be coupled to the plurality of antennas 114 and to the one or more of the processing elements 104. The IoT interface 400 may be configured to transmit and/or receive communication packets or signals at a sub 1-GHz band (i.e., IoT band) via the plurality of antennas 114. The received communication packets at the IoT frequency band may be converted by the IoT interface into a signal or communication packets that may be manipulated by the one or more processing elements 104 and route the resulting signal to the one or more processing elements 104.

As shown in FIG. 4, some of the clusters 406 may be grouped into one or more sets. For example, a first number of clusters 406 may be grouped into a first set 402 and a second number of clusters 406 may be grouped into a second set 404. Each of the clusters 406 in the first set 402 may be coupled to the radio interface 110, and the radio interface may route received signals to the clusters 406 in the first set 402. Each of the processing elements 104 in the clusters 406 may have a first instruction set loaded thereon and may process signals received from the radio interface 110 according to the first instruction set. The clusters 406 of the first set 402 may transmit processed signals to the clusters 406 of the second set 404 via one or more switches. Each of the processing elements 104 of the clusters 406 of the second set 404 may have a second instruction set loaded thereon and process the received signals according to the second instruction set to generate signals of a second type. The clusters 406 of the second set 404 may be coupled to the cellular interface 112 and may transfer the signals of the second type to the cellular interface 112 to be transmitted via a plurality of antennas (not shown).

Although each of the first set 402 and the second set 404 are shown as including nine clusters 406, greater or fewer clusters 406 may be dynamically added or subtracted from the first set 402 and/or the second set 404 based on system demands or signaling volumes. For example, if the number of radio signals received by the antennas and transmitted to the radio interface 110 increases, additional clusters 406 may be added to the first set 402 to handle the increased processing load.

Furthermore, additional sets of clusters 406 may be included within the reconfigurable fabric. For example, a third and fourth number of clusters 406 may be grouped into a third set of clusters 410 and fourth set of clusters 415. The third set of clusters 410 may correspond with a packet module 710, while the fourth set of clusters 415 may correspond with a routing module 715. Both the packet module 710 and the routing module 715 will be described in detail herein.

Figure 5:
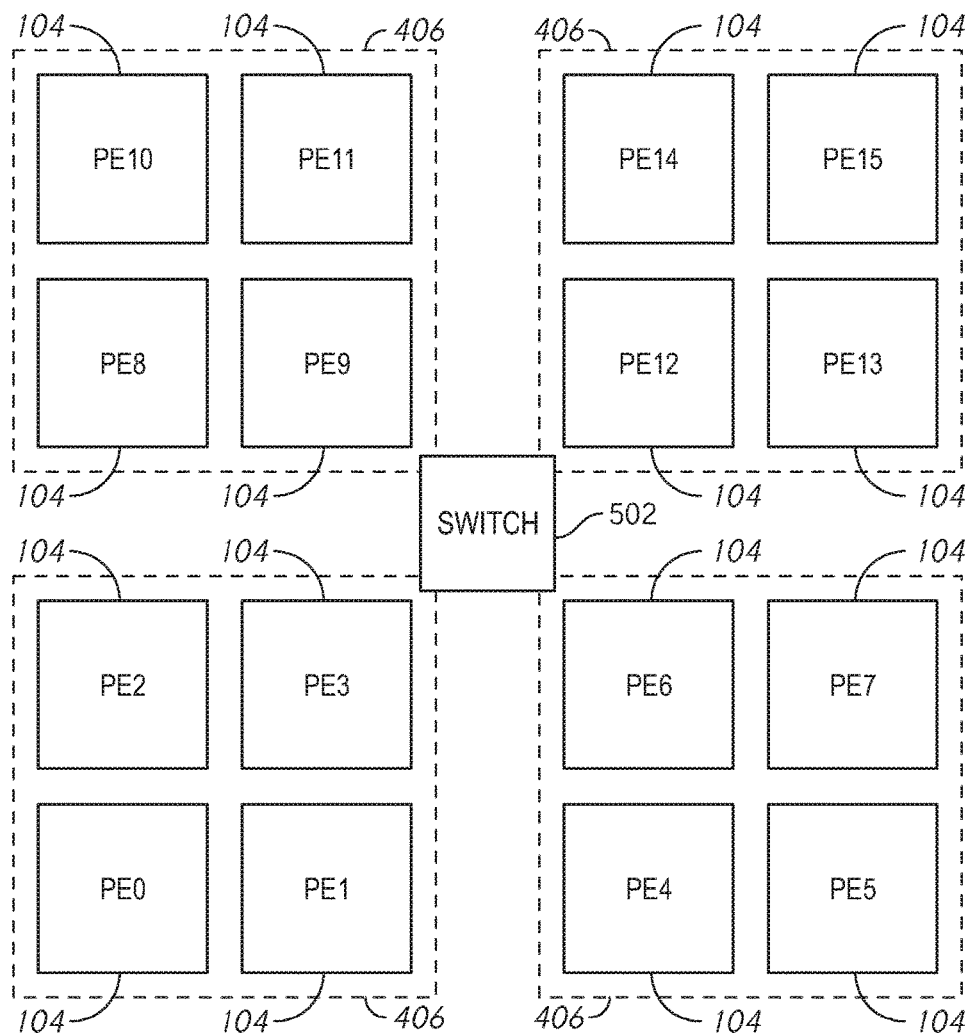
FIG. 5 is a block diagram of a plurality of processing elements, according to one illustrated example.

FIG. 5 is a block diagram of a plurality of clusters 406 coupled through a switch 502, in accordance with an example of the present disclosure. In the example of FIG. 5, each cluster 406 includes four processing elements 104. Each processing element 104 of a given cluster 406 may communicate directly with another processing element 104 within that same cluster 406. For example, each of the processing elements PE0-3 can directly communicate with one another. Similarly, processing elements PE4-7 can communicate directly, as can processing elements PE8-II and PE12-15. Processing elements 104 of different clusters 406 may communicate with one another via a switch 502 based on instructions in whatever instruction set is loaded for a given processing element 104. For example, the processing element PE14 may transmit a signal to the switch 502 with an instruction that the signal should be routed to the processing element PE1. The switch may route the signal directly to the processing element PE1 or the switch may route the signal to another processing element in the same cluster as PE1 (i.e., processing elements PE0, PE2, or PE3), which then route the received signal to processing element PE1. By linking clusters of processing elements together in this manner, greater or fewer clusters 406 may be added simply by changing the instruction sets that are loaded for a set of processing elements.

Figure 6:
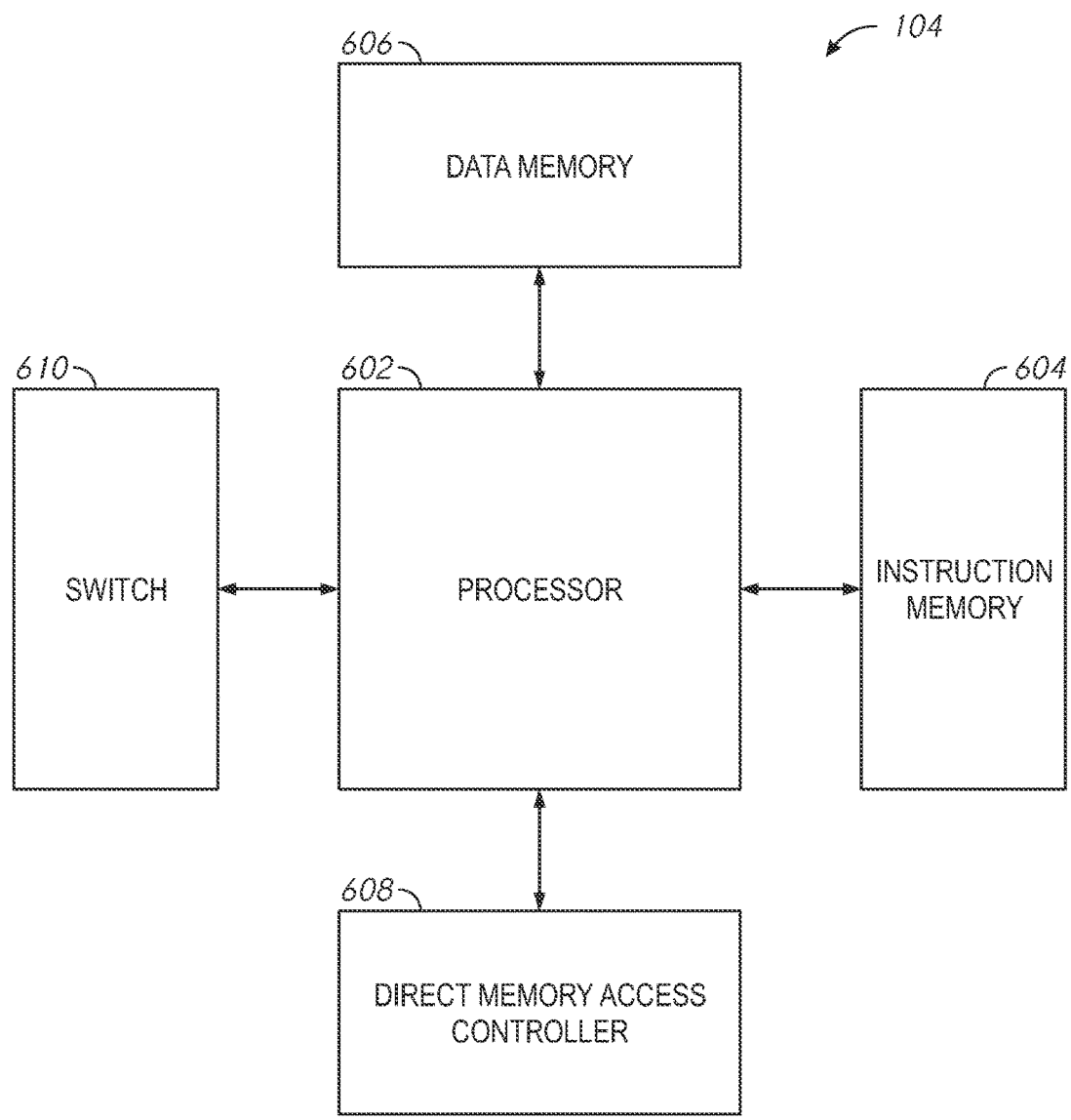
FIG. 6 is a block diagram of a processing element, according to one illustrated example.

FIG. 6 is a block diagram of a processing element 104, in accordance with an example of the present disclosure. The processing element 104 generally includes a processor 602 coupled to an instruction memory 604, a data memory 606, a direct memory access controller 608, and a switch 610.

The processor 602 may include, for example, a number of processing cores. In some examples, the processor 602 may include circuitry, including custom circuitry, and/or firmware for performing functions described herein. For example, circuitry can include multiplication units/accumulation units for performing operations described herein. The processor 602 may be, for example, a microprocessor or a digital signal processor (DSP), or any combination thereof. An example processor core can include an arithmetic logic unit (ALU), a bit manipulation unit, a multiplication unit, an accumulation unit, an adder unit, a look-up table unit, a memory look-up unit, or any combination thereof. The instruction memory 604 is a memory device configured to store a processing element instruction set. The instruction memory 604 may generally be any type of memory. For example, the instruction memory 604 may be a volatile memory, such as dynamic random access memory, or non-volatile memory, such as flash memory. The data memory 606 is a memory device configured to store received data, such as the data included in the signals received and/or transmitted from the plurality of antennas 114. The data memory 606 may generally be any type of memory. For example, the data memory 606 may be a volatile memory, such as dynamic random access memory, or non-volatile memory, such as flash memory. The direct memory access controller 608 includes control circuitry for the processor 602 to access the instruction memory 604 and the data memory 606. The switch 610 routes data from one processing element 104 to another processing element 104. For example, the switch 610 may route data from one processing element 104 to another processing element 104 within a single cluster 406. The switch may generally be any type of switching fabric.

In operation, a processing element instruction set may be loaded into and stored in the instruction memory 604. Data in the form of the received signals are stored in the data memory 606. The processor 602 processes the data in the data memory 606 in accordance with the processing element instruction set stored in the instruction memory 604. For example, the processor 602 may perform arithmetic operations, convert the data from one format to another, or perform any other type of operations. The direct memory access controller 608 may control access of the processor 602 to the instruction memory 604 and/or the data memory 606. The processor 602 may transfer processed data to one or more other processing elements 104 via the switch 610.

Figure 7:
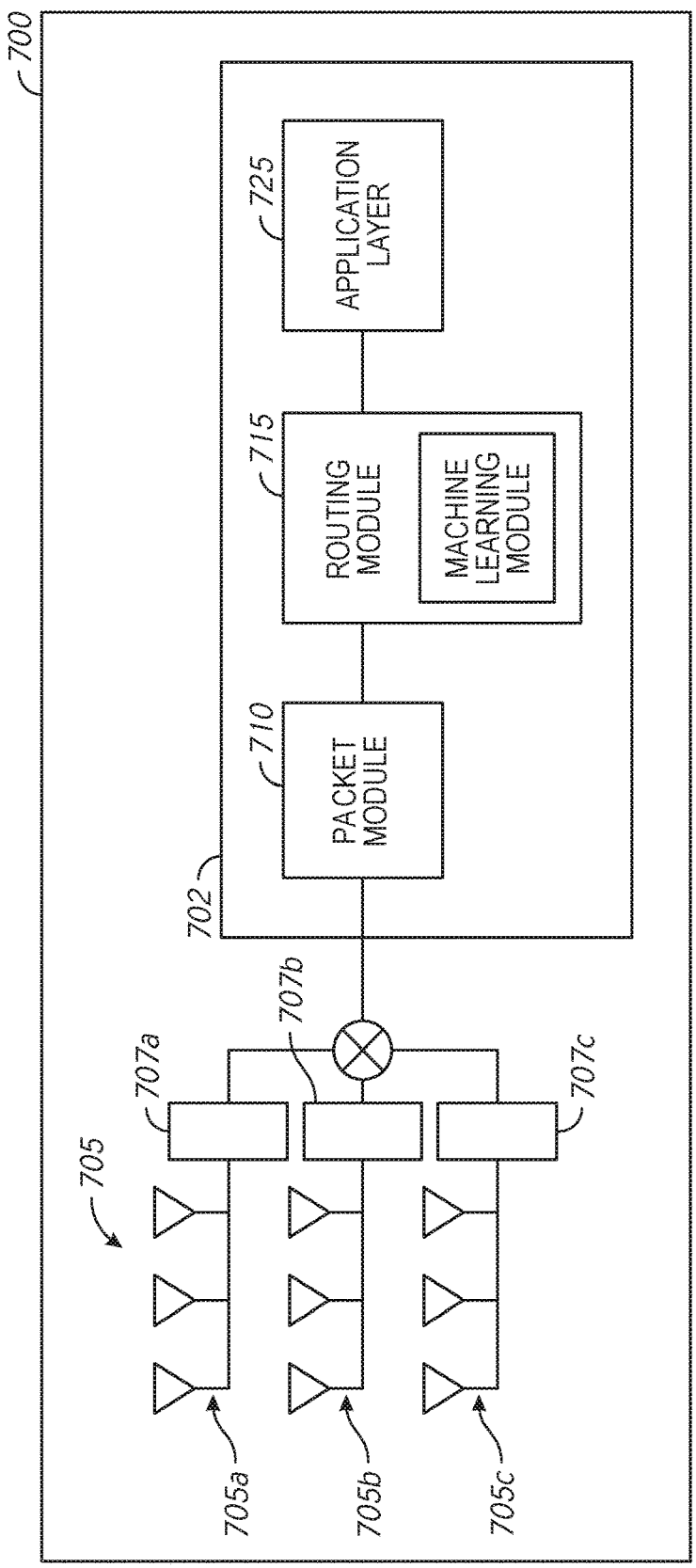
FIG. 7 is a block diagram of an integrated circuit chip configured to optimize routing of communication packets, according to one illustrated example.
Figure 8:
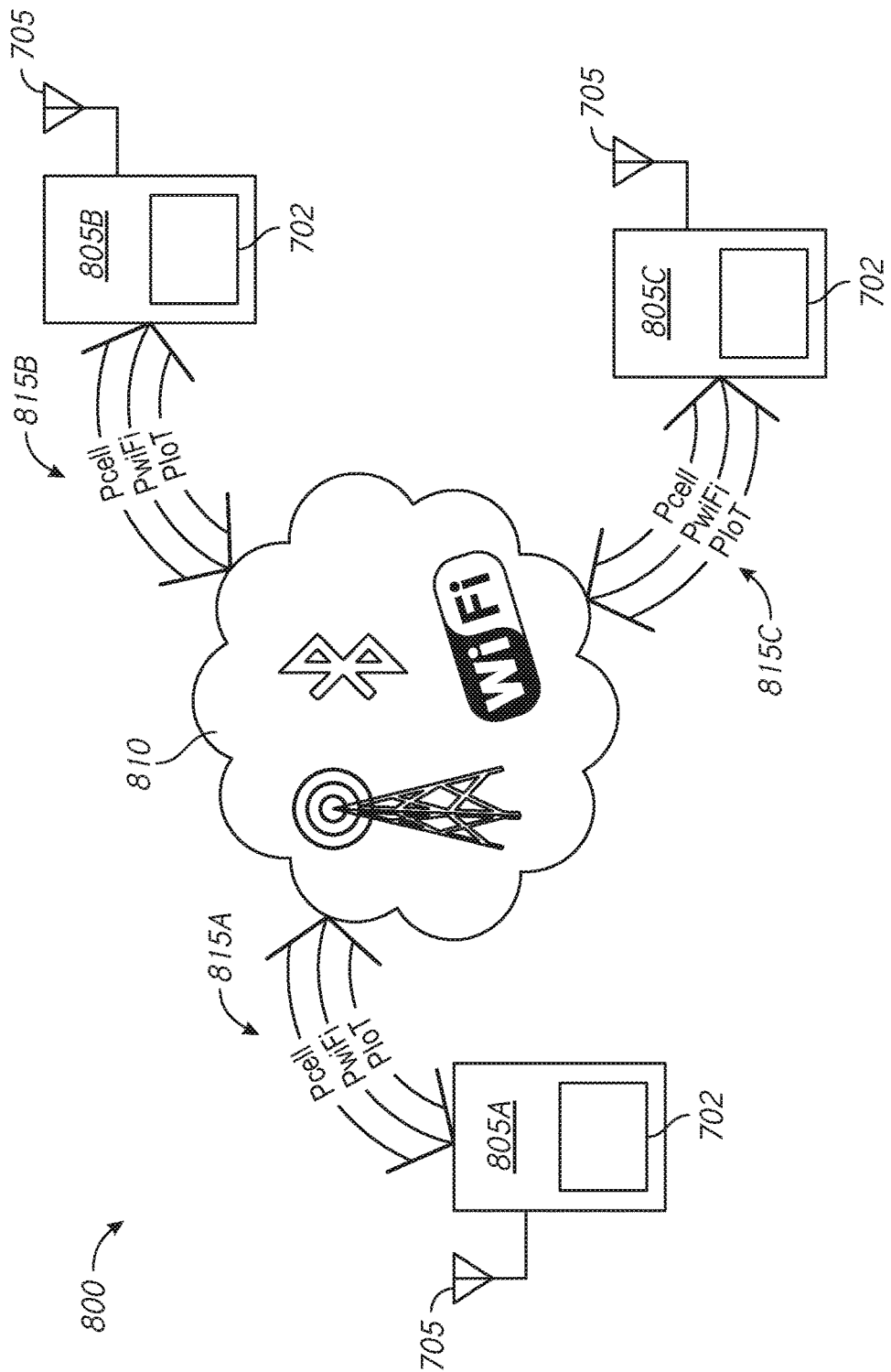
FIG. 8 is a graphical representation of a communication system having a plurality of devices communicatively coupled via a network, according to one illustrated example.

FIG. 7 shows a block diagram of the communication device 700 having an integrated circuit chip 702 and a plurality of antennas 705 embedded therein, while FIG. 8 shows a graphical representation of a communication system 800 having a plurality of communication devices 805 communicatively coupled via a network 810, according to one illustrated example. Reference will now be made to both FIGS. 7 and 8.

The integrated circuit chip 702 is configured to optimize routing of communication packets or signals from a source device 805A to a destination device 805B via one or more of the plurality of communication devices 805 through the network 810, as illustrated in FIG. 8. The network 810 may be configured to provide a plurality of communication paths 815A, 815B, 815C (collectively referenced 815) to route the communication packets or signals via a plurality of communication protocols $P_{cell}$, $P_{WiFi}$, $P_{IoT}$ (collectively referenced P). The plurality of communication paths 815 include data transmission paths between one or more of the plurality of devices 805 via one or more of the plurality of communication protocols P. The network 810 may, for example, take the form of one or more cellular, WiFi, and IoT (e.g., Bluetooth, ZIGBEE) networks operable to transmit signals or communication packets via one or more of the plurality of communication protocols. The network 810 may be a Local Area Network (LAN) or Wide Area Network (WAN).

The plurality of communication devices 805 may, for example, include mobile phones, tablets, smart phones, personal computers, and laptops, to name a few. The plurality of antennas 705 are operable to transmit and receive the communication signals via a plurality of communication protocols, such as cellular, 4G LTE, 5G, WiFi, BLUETOOTH, and ZIGBEE to name a few. The plurality of antennas 705 may be communicatively coupled to a plurality of interfaces 707. The plurality of interfaces 707 may include an analog to digital converter to convert the received communication signal via the plurality of antennas 705 into the communication packets that can be processed within the integrated circuit chip 702. Furthermore, the plurality of interfaces 707 may also include a digital to analog converter to convert the processed plurality of communication packets into an analog signal for transmission via the plurality of antennas 705.

In one example, the plurality of antennas 705 comprise various sets of antennas 705a, 705b, 705c where each of the sets receive communication signals via different ones of the plurality of communication protocols P. The plurality of antennas 705 are operable to transmit and receive the communication packets or signals via the plurality of communication protocols P.

In one example, first, second and third sets of antennas 705a, 705b, 705c, are respectively coupled to first, second, and third interfaces 707a, 707b, 707c. Each of the first, second, and third interfaces may convert the signals received via defined ones of the plurality of protocols. For example the first interface may be a cellular interface, the second interface may be a radio interface, and a third interface may be an IoT interface. In other words, the first interface 707a may be configured to convert signals received via a cellular protocol, the second interface 707b may convert signals received via the radio protocol, and the third interface 707c may convert signals received via one of the IoT protocols. It will be appreciated by those of ordinary skill in the art that the communication device 700 may employ a single set of antennas 705 coupled to a single interface 707, where signals received via any one of the plurality of protocols may be converted by the interface 707 for processing by the integrated circuit chip 702.

Similarly to the FIG. 1 description, the integrated circuit chip 702 may be a single chip capable of processing the plurality of communication packets or signals. Examples of single chip systems include those where circuitry for performing the described tasks are fabricated on and/or into a common substrate generally using semiconductor fabrication techniques. The integrated circuit chip 702 comprises a packet module 710, a routing module 715 communicatively coupled to a machine learning module 720, and an application layer 725.

The packet module 710 comprises a first plurality of processing elements 104 (or a third set of clusters 410) operable to receive the communication packets via a first one of the plurality of communication protocols P and process an optimal route to transmit the communication packets from the source device 805A to the destination device 805B via the network 810. As will be described in more detail herein, the optimal route may be one or more of the communication paths 815 through the one or more devices 805 that results in an optimized transmission of the communication packets or signals. The packet module 710 may detect transmission of the communication packets from the source device 805A intended for the destination device 805B, and process a re-route of the transmitted communication packets or signal to the destination device 805 via the optimal route of the plurality of communication paths 815. In particular, the optimal route includes the one or more of the communication paths 815 via one or more of the plurality of communication protocols P. For example, the optimal route between the source device 805A and the destination device 805B may be through the communication paths 815A and 815C via a cellular protocol $P_{cell}$ and then through communication paths 815C and 815B via a WiFi protocol $P_{WiFi}$.

The routing module 715 comprises a second plurality of processing elements 104 (or a fourth set of clusters 415)

communicatively coupled to the first plurality of processing elements 104 of the packet module 710. The routing module 715 is operable to determine the optimal route to re-route the transmitted communication packets or signal from the source device 805A to the destination device 805B based on transmission characteristics associated with the plurality of devices 805. The transmission characteristics include at least one of availability of processing resources and telemetry information associated with respective ones of the plurality of devices 805.

The availability of processing resources associated with respective ones of the plurality of devices 805 may refer to a percentage of processing elements 104 available for respective ones of the plurality of communication protocols P. The processing resources include respective ones of the plurality of processing elements 104 associated with respective ones of the plurality of communication protocols P. As discussed above, the integrated circuit chip 702 includes the sets of clusters 406 having processing elements 104 therein. Each of the processing elements 104 in the clusters 406 may have instructions loaded thereon and process received signals or communication packets according to those instructions. For example, in each of the plurality of devices 805, a portion of the plurality of processing elements 104 may be instructed to process signals via a first one of the plurality of communication protocols $P_{cell}$, while another portion of the plurality of processing elements 104 may be instructed to process signals via a second one of the plurality of communication protocols $P_{WiFi}$. In other words, a defined percentage of the plurality of processing elements 104 on respective ones of the plurality of devices 805 may be allocated for a particular communication protocol P. As such, as devices communicate in real-time via various ones of the communication protocols P, availability of the processing resources may decrease. The availability of processing resources is an indication of whether transmission of signals or communication packets via particular communication protocols P and communication devices 805 may be delayed or interrupted.

The telemetry information may include at least one of velocity, direction of movement, or geographic location of respective ones of the plurality of devices 805. For example, as will be described in more detail herein, the destination device 805B may be moving outside a WiFi zone while the source device 805A attempts to transmit the signal or communication packets. The routing module 715 of at least one of the plurality of devices 805 may re-route the transmitted signal via the cellular protocols $P_{cell}$ and across the communication paths 815A and 815B to prevent disconnect while leveraging communication via the WiFi protocol. It will be appreciated by those of ordinary skill in the art that this is merely one example, and any other combination of communication paths 815, devices 805, and communication protocols P are within the scope of examples of the disclosure. The routing module 715 may receive telemetry information and resource availability information from each of the plurality of devices 805. The receipt of such information at the routing module 715 may occur in real-time or close to real-time. This information may be shared with the machine learning module 720 to allow of communication trends to more accurately predict a likelihood of resource availability for each of the plurality of devices 805, as well as determine efficient re-allocation of processing resources to better handle future communication requests.

The routing module 715 is communicatively coupled to a machine learning module 720. The machine learning module 720 may be located within the routing module 715, embedded within the integrated circuit chip 702, or located remote from the integrated circuit chip 702. For example, the machine learning module 720 may be located in the cloud to offload processing power from the integrated circuit chip 702. It will be appreciated by those of ordinary skill in the art, the machine learning module 720 may be located anywhere. Additionally, the machine learning module may be communicatively coupled to the routing module 715 embedded within each one of the plurality of communication devices 805. Alternatively, the machine learning module 720 may be communicatively coupled with only one of the plurality of devices 805 that is in hierarchical control of remaining ones of the plurality of devices 805 in the system 800.

The machine learning module 720 is operable to calculate the optimal route to re-route the transmitted communication packets or signal based on historic transmission characteristics associated with the plurality of communication devices 805. The historic transmission characteristics of the plurality of communication devices 805 allows the machine learning module 720 to extrapolate a likelihood that one or more of the plurality of communication devices 805 will have particular transmission characteristic in a future time. Based on the likelihood determination, the routing module 715 calculates the optimal route and instructs the packet module 710 accordingly. The optimal route may be based on at least one of the anticipated amount of available processing resources and telemetry information for respective devices 805 in the near future. The optimal route to re-route the transmitted communication packets or signal includes one or more of the communication paths 815 between one or more of the plurality of devices 805 via one or more of the plurality of communication protocols P.

Consequently, the routing module 715 leverages both the real-time (or near real-time) and anticipated resource determination when instructing the packet module 710 to route the communication packets or signal.

The following are a few example examples implementing the route optimization and resource allocation as described above. These are not meant to be an exhaustive listing of examples but a mere sampling to highlight the above-described optimization scheme.

In one example, the system 800 is configured to determine a single one of the plurality of devices 805 that will have hierarchical control over remaining ones of the devices 805. For example, the device 805C may be in hierarchical control ("control device") over the source device 805A and the destination device 805B. The control device 805C may obtain hierarchical control in an ad hoc manner or as part of a hierarchical network. The ad hoc determination of the control device 805C may be in response to a contention algorithm where the control device 805C establishes control over the devices 805A and 805B. Alternatively, the system 800 may employ the hierarchical network configuration where the control device 805C is dedicated as the hierarchical control over the other devices 805A, 805B in the system 800.

In a first example, the source device 805A transmits communication packets or signals to the destination device 805B via a first communication protocol $P_{cell}$ (e.g., cellular) at a same time each day. The destination device 805B may consistently travels through a same WiFi zone at that time. Additionally, a user of the destination device 805B may typically be downloading data on the device 805B via the first communication protocol $P_{cell}$ at the same time each day while traversing between WiFi and non-WiFi zones. The machine learning module 720 may learn the transmission characteristics associated with the devices 805A and 805B, namely that the source device 805A transmits the signal via the first communication protocol $P_{cell}$ and that the destination device 805B travels through a WiFi zone at the same time each day while the destination device 805B downloads data via the first communication protocol (e.g., 4G LTE). Consequently, the routing module 715 may instruct the packet module 710 to specifically re-route the communication packets from the source device 805A to the destination device 805B to create efficient or optimized communications. In particular, the source device 805A may transmit the communication packets via the first communication protocol $P_{cell}$ to the control device 805C, and then the control device 805C may transmit the communication packets to the destination device 805B via a second communication protocol $P_{WiFi}$ (e.g., WiFi communication). As such, the optimal route processed by the routing module and implemented by the packet module allows for leveraging one or more of the devices 805 to efficiently use available processing resources.

In a second example, the control device 805C may be leveraged to reallocate processing resources for each of the plurality of devices 805 based on the transmission characteristics as determined in real-time (or close to real-time) and as predicted in the future. For example, through the machine learning module 720, the control device 805C may learn that a majority of the plurality of devices 805 leverage the processing resources for downloading streaming media content at a particular time of a day. Consequently, those ones of the plurality of devices 805 may have a majority of the plurality of processing elements 104 re-allocated to WiFi or IoT protocols during the particular time of the day. This would allow for an efficient use of the existing amount of processing resources on the integrated circuit chip 702.

Alternatively and/or additionally, rather than relying on a single one of the plurality of devices 805 to serve as the control device 805C, each one of the plurality of devices 805 may be configured to leverage its own reallocation of processing resources based on monitoring its own usage.

As a third example, the source device 805A may have its processing resources allocated to the first communication protocol $P_{cell}$ (e.g., cellular) and the second communication protocol $P_{WiFi}$ (e.g., WiFi). On the other hand, the destination device 805B may have processing resources allocated to the second communication protocol $P_{WiFi}$ and the third communication protocol $P_{IoT}$ (e.g., Zigbee, RFID, Bluetooth). The routing module 715 of the control device 805C or of any other of the plurality of devices 805 may determine the distance between the source and destination devices 805A, 805B is great and/or the WiFi network connection therebetween is clogged. In response to such determination, the routing module 715 may instruct the packet module 710 to re-route the communication packets through the communication paths 815A and 815C via the first communication protocol $P_{cell}$ to the control device 805C. Then the control device 805C may transmit the received communication packets along the communication paths 815C and 815B via the third communication protocol $P_{IoT}$ to the destination device 805B. In other words, the routing module 715 may determine a common communication protocol P between respective ones of the plurality of devices 805 to transmit the communication packets or signals. The common communication protocol P selected may be one that has sufficient processing resources available therewith.

In another example, the machine learning module 720 may be operable to prioritize routing the signals or communication packets between the plurality of devices 805. In particular, the machine learning module 720 may determine priority based on historical bandwidth consumption associated with a specific type of data transmission. For example, streaming media transmission may have a higher priority than a cellular transmission, while the cellular transmission may have a higher priority than asynchronous text-messaging communication. It will be appreciated by those of ordinary skill in the art that priority ranking of various types of communication may be set according to any desired ranking. Additionally, the particular ranking of communication types may, for example, vary based on various factors such as, for example, time, day, location, weather patterns, etc.

Alternatively and/or additionally, the routing module 715 may determine prioritization of routes based, at least in part, on a defined user hierarchy associated with each of the plurality of devices 805. For example, if the source device 805A or the destination device 805B is owned by a President of a company, the President's device 805A, 805B may have a higher priority over devices 805 used by employees of the company. In other words, the communication packets or signals routed to or from the President's device 805 may be allocated a faster route (or priority route) than the route allocated to communication packets or signals transmitted to/from the employees' devices 805.

Furthermore, the routing module 715 may single out a specific communication as highest priority level for routing, regardless of the defined user hierarchy associated with respective ones of the plurality of devices 805 or bandwidth considerations. For example, the routing module 715 may allocate emergency communications (e.g., 9-1-1 calls or 9-1-1 text messaging) as highest priority communication. It will be appreciated by those of ordinary skill in the art, the routing module 715 may single out and allocate any other communication as highest priority such as, for example, calls originating from a child's school or a child's caretaker.

Prioritizing routes refers to allocating transmission of the signals or communication packets through various communication paths 815 and protocols to achieve a speedy communication between the source and destination devices 805A, 805B via the network 810. The prioritized routes may entail real-time communication without substantial communication delay. A high priority communication may be allocated a fast communication route between the source and destination devices 805A, 805B, while a low priority communication may be allocated a slower communication route between the source and destination devices 805A, 805B. As mentioned above, the control device 805C may receive the communication packets transmitted from the source device 805A intended for the destination device 805B. For example, if the plurality of devices 805 comprise more than one pair of source-destination devices 805A, 805B, the control device 805C may prioritize which ones of the source-destination device 805A, 805B pairs will have priority over the other. In other words, the control device 805C may allocate a faster communication path for a first one of the source-destination device 805A, 805B pairs and a slower communication path for a second one of the source-destination device 805A, 805B pairs. In particular, this allocation of priority may be determined in response to the control device 805C detecting at least one of the type of communication packets received at the packet module 710, the bandwidth consumption associated with the communication packets or signal as determined by the machine learning module 720, the origin of transmitted communication packets or signal, or the defined user hierarchy associated with the destination and/or source devices 805A, 805B.

Based on the control device's 805C detection, the routing module 715 will determine the one or more communication paths 815 through the one or more devices 805 that results in a transmission speed in-line with the determined priority level of the communication.

Having described some examples of the disclosure, additional examples will become apparent to those skilled in the art to which it pertains. Specifically, although reference was made throughout the specification and drawings to three communication devices (i.e., source, destination, and control devices), it will be appreciated that the system and methods described herein are applicable to examples having any number of communication devices. The example of three communication devices was described merely to readily convey and describe various aspects of re-routing communication packets to optimize the communication between devices, and was not intended to limit the system in any way. For example, the routing module may instruct re-routing of the communication packets or signals from the source device to the destination devices through the control device and any other communication device within the network. Alternatively, the re-routed communication packets may be routed through any of the plurality of devices and not through the control device.

The control device may be any one of the plurality of devices 805, or embedded within a base station. Additionally, each of the plurality of communication devices 805 may have a routing module coupled to a machine learning module where the routing module communicates with other routing modules of the plurality of devices. As such, each of the plurality of devices 805 may serve as its own control device to coordinate and process optimized routing of communication packets or signals therebetween without requiring a central control device.

The term "communication packets" and "signal" have been used interchangeably herein and both refer to data that is communicated between communication devices. The "communication packets" may refer to a digitized format of data while "signals" may refer to an analog form of data. Examples described herein are applicable to all forms of data.

The terms "communication devices" and "devices" have been used interchangeably herein. The plurality of devices 805 may, for example, be mobile communication devices.

Figure 9:
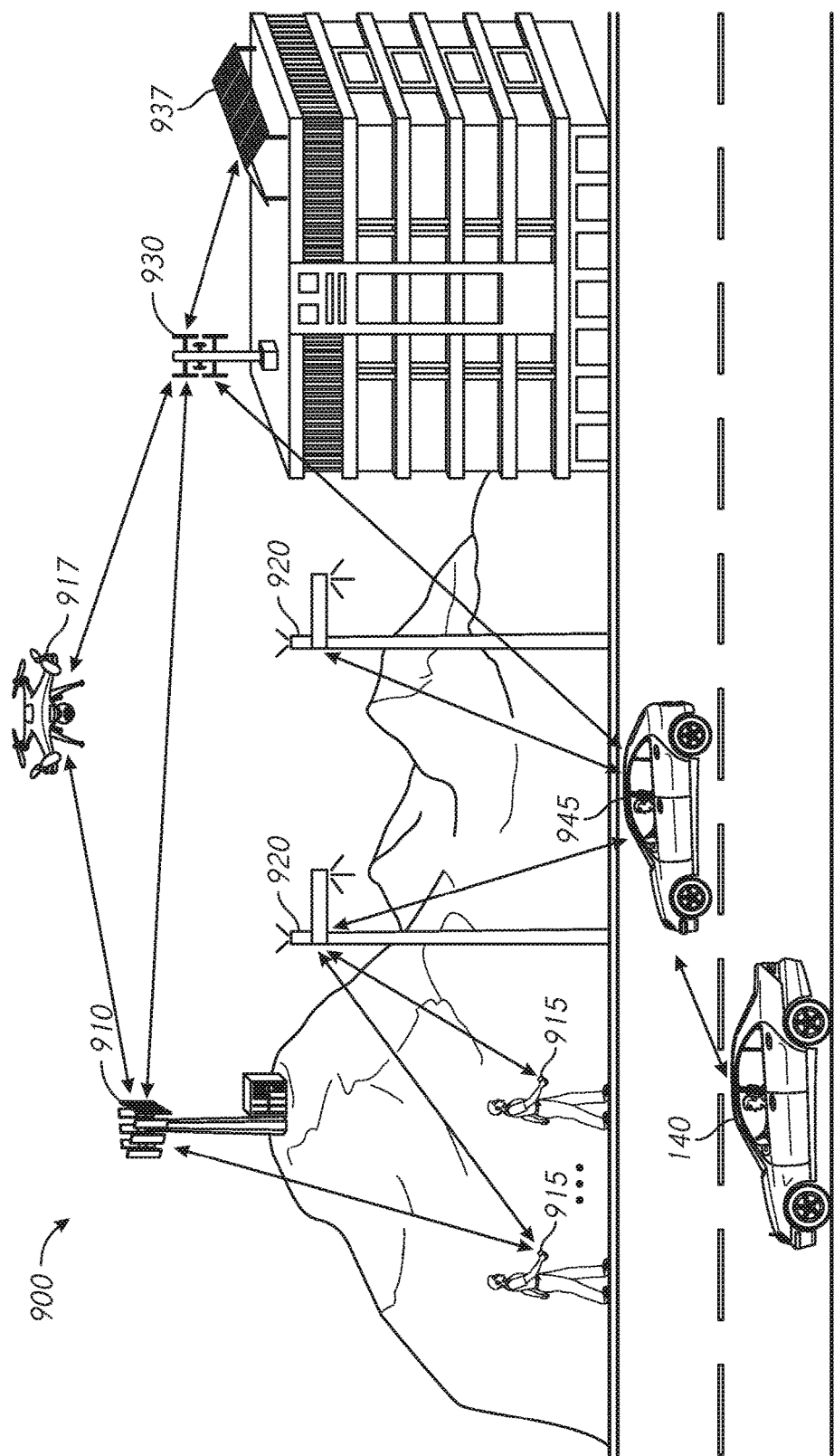
FIG. 9 is a schematic illustration of a wireless communications system arranged in accordance with aspects of the present disclosure.

FIG. 9 illustrates an example of a wireless communications system 900 in accordance with aspects of the present disclosure. The wireless communications system 900 includes a base station 910, a mobile device 915, a drone 917, a small cell 930, and vehicles 940, 945. The base station 910 and small cell 930 may be connected to a network that provides access to the Internet and traditional communication links. The system 900 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 900 may depict aspects of a radio access network (RAN), and system 900 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 910, communication devices 920, and small cells 930 may be coupled with the core network or with one another, or both, via wired or wireless backhaul links (e.g., Si interface, X2 interface, etc.).

The system 900 may provide communication links connected to devices or "things," such as sensor devices, e.g., solar cells 937, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 900 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 937, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 915 may receive sensor data from the user utilizing the mobile device 915, such as blood pressure data, and may transmit that sensor data on a narrowband IoT frequency band to base station 910. In such an example, some parameters for the determination by the mobile device 915 may include availability of licensed spectrum, availability of unlicensed spectrum, and/or time-sensitive nature of sensor data. Continuing in the example, mobile device 915 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 915 may form device-to-device (D2D) connections with other mobile devices or other elements of the system 900. For example, the mobile device 915 may form RFID, WiFi, MultiFire, Bluetooth, or Zigbee connections with other devices, including communication device 920 or vehicle 945. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 915 to provide information (e.g., sensor data) collected on different frequency bands than a frequency band determined by mobile device 915 for transmission of that information.

Moreover, some communication devices may facilitate ad-hoc networks, for example, a network being formed with communication devices 920 attached to stationary objects (e.g., lampposts in FIG. 9) and the vehicles 940, 945, without a traditional connection to a base station 910 and/or a core network necessarily being formed. Other stationary objects may be used to support communication devices 920, such as, but not limited to, trees, plants, posts, buildings, blimps, dirigibles, balloons, street signs, mailboxes, or combinations thereof. In such a system 900, communication devices 920 and small cell 930 (e.g., a small cell, femtocell, WEAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 915 communicating with base station 910 on a cellular communication band.

The communication devices 920 may form wireless networks, operating in either a hierarchal or ad-hoc network fashion, depending, in part, on the connection to another element of the system 900. For example, the communication devices 920 may utilize a 700 MHz communication frequency to form a connection with the mobile device 915 in an unlicensed spectrum, while utilizing a licensed spectrum communication frequency to form another connection with the vehicle 945. Communication devices 920 may communicate with vehicle 945 on a licensed spectrum to provide direct access for time-sensitive data, for example, data for an autonomous driving capability of the vehicle 945 on a 5.9 GHz band of Dedicated Short Range Communications (DSRC).

Vehicles 940 and 945 may form an ad-hoc network at a different frequency band than the connection between the communication device 920 and the vehicle 945, For example, for a high bandwidth connection to provide time-sensitive data between vehicles 940, 945, a 24 GHz mmWave band may be utilized for transmissions of data between vehicles 940, 945. For example, vehicles 940, 945 may share real-time directional and navigation data with each other over the connection while the vehicles 940, 945 pass each other across a narrow intersection line, Each vehicle 940, 945 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 920 and the vehicle 945, for example, for processing of image data received at both vehicle 945 and vehicle 940, as transmitted by the vehicle 940 to vehicle 945 over the 24 GHz mmWave band. While shown as automobiles in FIG. 9, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 900 in other mmWave bands or other frequency bands, such as 28 GHz, 37 GHz, 38 GHz, 39 GHz, which may be licensed or unlicensed bands. In some cases, vehicles 940, 945 may share the frequency band that they are communicating on with other vehicles in a different network. For example, a fleet of vehicles may pass vehicle 940 and, temporarily, share the 24 GHz mmWave band to form connections among that fleet, in addition to the 24 GHz mmWave connection between vehicles 940, 945. As another example, communication device 920 may substantially simultaneously maintain a 700 MHz connection with the mobile device 915 operated by a user (e.g., a pedestrian walking along the street) to provide information regarding a location of the user to the vehicle 945 over the 5.9 GHz band. In providing such information, communication device 920 may leverage antenna diversity schemes as part of a massive MIMO framework to facilitate time-sensitive, separate connections with both the mobile device 915 and the vehicle 945. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 910 and small cell 930 may wirelessly communicate with devices in the system 900 or other communication-capable devices in the system 900 having at the least a sensor wireless network, such as solar cells 937 that may operate on an active/sleep cycle, and/or one or more other sensor devices. The base station 910 may provide wireless communications coverage for devices that enter its coverages area, such as the mobile device 915 and the drone 917. The small cell 930 may provide wireless communications coverage for devices that enter its coverage area, such as near the building that the small cell 930 is mounted upon, such as vehicle 945 and drone 917.

Generally, a small cell 930 may be referred to as a small cell and provide coverage for a local geographic region, for example, coverage of 200 meters or less in some examples. This may contrasted with at macrocell, which may provide coverage over a wide or large area on the order of several square miles or kilometers. In some examples, a small cell 930 may be deployed (e.g., mounted on a building) within some coverage areas of a base station 910 (e.g., a macrocell) where wireless communications traffic may be dense according to a traffic analysis of that coverage area. For example, a small cell 930 may be deployed on the building in FIG. 9 in the coverage area of the base station 910 if the base station 910 generally receives and/or transmits a higher amount of wireless communication transmissions than other coverage areas of that base station 910. A base station 910 may be deployed in a geographic area to provide wireless coverage for portions of that geographic area. As wireless communications traffic becomes more dense, additional base stations 910 may be deployed in certain areas, which may alter the coverage area of an existing base station 910, or other support stations may be deployed, such as a small cell 930. Small cell 930 may be a femtocell, which may provide coverage for an area smaller than a small cell (e.g., 100 meters or less in some examples (e.g., one story of a building)).

While base station 910 and small cell 930 may provide communication coverage for a portion of the geographical area surrounding their respective areas, both may change aspects of their coverage to facilitate faster wireless connections for certain devices. For example, the small cell 930 may primarily provide coverage for devices surrounding or in the building upon which the small cell 930 is mounted. However, the small cell 930 may also detect that a device has entered is coverage area and adjust its coverage area to facilitate a faster connection to that device.

For example, a small cell 930 may support a massive MIMO connection with the drone 917, which may also be referred to as an unmanned aerial vehicle (UAV), and, when the vehicle 915 enters it coverage area, the small cell 930 adjusts some antennas to point directionally in a direction of the vehicle 945, rather than the drone 917, to facilitate a massive MIMO connection with the vehicle, in addition to the drone 917. In adjusting some of the antennas, the small cell 930 may not support as fast as a connection to the drone 917, as it had before the adjustment. However, the drone 917 may also request a connection with another device (e.g., base station 910) in its coverage area that may facilitate a similar connection as described with reference to the small cell 930, or a different (e.g., faster, more reliable) connection with the base station 910. Accordingly, the system 930 may enhance existing communication links in providing additional connections to devices that may utilize or demand such links. For example, the small cell 930 may include a massive MIMO system that directionally augments a link to vehicle 945, with antennas of the small cell directed to the vehicle 945 for a specific time period, rather than facilitating other connections (e.g., the small cell 930 connections to the base station 910, drone 917, or solar cells 937). In some examples, drone 917 may serve as a movable or aerial base station.

The wireless communications system 900 may include devices such as base station 910, communication device 920, and small cell 930 that may support several connections to devices in the system 900. Such devices may operate in a hierarchal mode or an ad-hoc mode with other devices in the network of system 900. While described in the context of a base station 910, communication device 920, and small cell 930, it can be appreciated that other devices that can support several connections with devices in the network may be included in system 900, including but not limited to: macrocells, femtocells, routers, satellites, and RFID detectors.

In various examples, the elements of wireless communication system 900, such as base station 910, a mobile device 915, a drone 917, communication device 920, a small cell 930, and vehicles 940, 945, may be implemented utilizing an integrated circuit chip as described herein. For example, the communication device 920 may be implemented with an integrated circuit chip 102 or integrated circuit chip 702. In the latter case, the communication device 920 may be implemented as the communication device 700. In various examples, the elements of communication system 900 may implement any of the systems described in FIGS. 1 and 4-8 or methods described in FIGS. 2-3.

Figure 10:
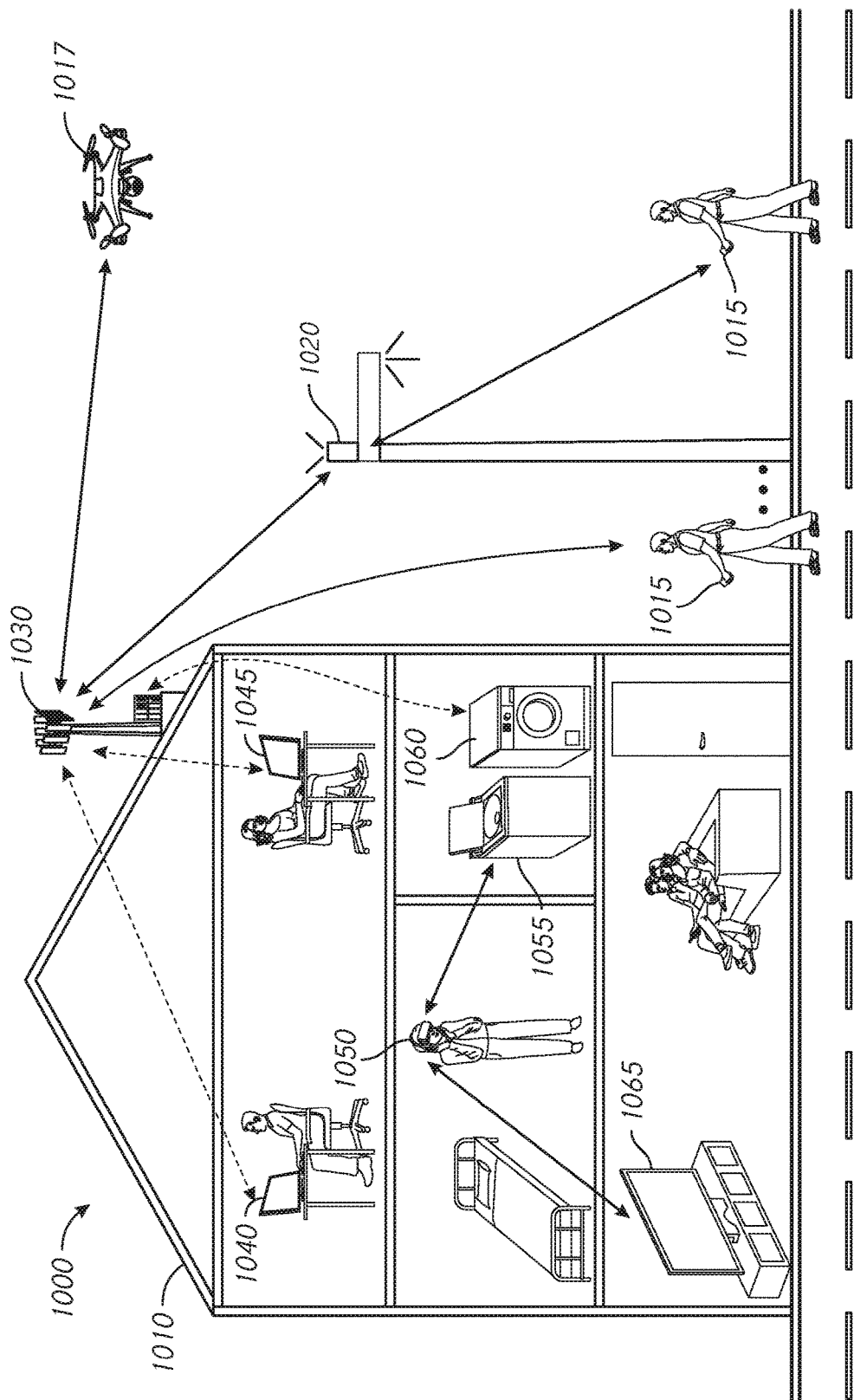
FIG. 10 is a schematic illustration of a wireless communications system arranged in accordance with aspects of the present disclosure.

FIG. 10 illustrates an example of a wireless communications system 1000 in accordance with aspects of the present disclosure. The wireless communications system 1000 includes a mobile device 1015, a drone 1017, a communication device 1020, and a small cell 1030. A building 1010 also includes devices of the wireless communication system 1000 that may be configured to communicate with other elements in the building 1010 or the small cell 1030. The building 1010 includes networked workstations 1040, 1045, virtual reality device 1050, IoT devices 1055, 1060, and networked entertainment device 1065. In the depicted system 1000, IoT devices 1055, 1060 may be a washer and dryer, respectively, for residential use, being controlled by the virtual reality device 1050. Accordingly, while the user of the virtual reality device 1050 may be in different room of the building 1010, the user may control an operation of the IoT device 1055, such as configuring a washing machine setting. Virtual reality device 1050 may also control the networked entertainment device 1065. For example, virtual reality device 1050 may broadcast a virtual game being played by a user of the virtual reality device 1050 onto a display of the networked entertainment device 1065.

The small cell 1030 or any of the devices of building 1010 may be connected to a network that provides access to the Internet and traditional communication links. Like the system 900, the system 1000 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 900. System 1000 may operate and be configured to communicate analogously to system 900. Accordingly, similarly numbered elements of system 1000 and system 900 may be configured in an analogous way, such as communication device 920 to communication device, small cell 930 to small cell 1030, etc. . . .

Like the system 900, where elements of system 900 are configured to form independent hierarchal or ad-hoc networks, communication device 920 may form a hierarchal network with small cell 1030 and mobile device 1015, while an additional ad-hoc network may be formed among the small cell 1030 network that includes drone 1017 and some of the devices of the building 1010, such as networked workstations 1040, 1045 and IoT devices 1055, 1060.

Devices in communication system 1000 may also form (D2D) connections with other mobile devices or other elements of the system 1000. For example, the virtual reality device 1050 may form a narrowband IoT connections with other devices, including IoT device 1055 and networked entertainment device 1065. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 1050.

In various examples, the elements of wireless communication system 1000, such as the mobile device 1015, the drone 1017, the communication device 1020, and the small cell 1030, the networked workstations 1040, 1045, the virtual reality device 1050, the IoT devices 1055, 1060, and the networked entertainment device 1065, may be implemented utilizing an integrated circuit chip as described herein. For example, the communication device 1020 may be implemented with an integrated circuit chip 102 or integrated circuit chip 702. In an example, the IoT devices 1055, 1060 may implement an integrated circuit having several processing elements like processing element 104 that is coupled to an IoT interface 400 in that integrated circuit for transmitting and/or receiving communication packets or signals at an IoT band via the plurality of antennas 114.

In an example, the small cell 1030 may determine prioritized routes among the device of the building 1010. Higher prioritized routes may include a cellular connection for the drone 1017 and WiFi connections for the networked workstations 1040, 1045, while lower prioritized routes may include an IoT connection to the IoT device 1060. Consequently, a routing module 715 of the small cell 1030 may instruct the packet module 710 to specifically re-route the communication packets from the networked workstation 1040 to the drone 1017 to create efficient or optimized communications. In the example, the networked workstation 1040 may transmit the communication packets via a first communication protocol (e.g., $P_{WiFi}$) to the small cell 1030, and then the small cell 1030 may transmit the communication packets to the drone 1017 via a second communication protocol (e.g., $P_{cell}$). Additionally or alternatively, in a cluster of processing elements 104 that are communicating a processed signal to a cellular interface 112 for the small cell 1030 to communicate with the drone 1017, greater or fewer clusters 406 may be dynamically added or subtracted from a first set of clusters 402 and/or a second set of clusters 404 based on system demands or signaling volumes. For example, if a number of cellular signals received by the antennas and transmitted to the a cellular interface 112 increases based on additional communication signals from the drone 1017, additional clusters 406 may be added to the first set of clusters 404 to handle the increased processing load.

While described above in the context of some specific examples of the elements of communication system 1000, the elements of communication system 1000 may implement any of the systems described in FIGS. 1 and 4-8 or methods described in FIGS. 2-3.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method comprising:
   receiving, at a first antenna, a first signal associated with a first wireless communications protocol;
   detecting the first signal at a first interface associated with the first wireless communications protocol to associate the first signal with the first wireless communications protocol;
   routing the first signal to a first set of processing elements;
   processing, at the first set of processing elements, the first signal based on a first instruction set associated with the first wireless communications protocol;
   processing, with at least one processing element associated with the first wireless communication protocol, the first signal to generate a second signal associated with a second wireless communications protocol;
   routing the second signal to a second set of processing elements;
   processing, at the second set of processing elements which includes the at least one processing element, the second signal based on a second instruction set associated with the second wireless communications protocol to transmit the second signal; and
   transmitting, at a second antenna, the second signal associated with the second wireless communications protocol.

2. The method of claim 1, wherein processing the first signal to generate the second signal comprises:
   allocating a first set of processing elements to process the first signal based on a first instruction set associated with the first wireless communications protocol; and
   allocating a second set of processing elements to process the second signal based on a second instruction set associated with the second wireless communications protocol.

3. The method of claim 2, further comprising:
   receiving, at the first antenna, a third signal associated with the first wireless communication protocol; and
   allocating additional processing elements to the first set of processing elements to process the third signal based on the first instruction set associated with the first wireless communications protocol.

4. The method of claim 1, further comprising:
   identifying a route for the second signal based on historic transmission characteristics associated with a plurality of devices and a route prediction for at least one device of the plurality of devices, wherein the second signal is to be transmitted to the at least one device.

5. The method of claim 4, further comprising:
   allocating processing elements to the second set of processing elements to process the second signal based on the historic transmission characteristics associated with the plurality of devices and the route prediction for the at least one device.

6. The method of claim 1, further comprising:
   receiving, at a third antenna, a third signal associated with a third wireless communication protocol; and
   determining a common communication protocol among a first device that transmitted the first signal and a second device that transmitted the third signal based on available processing elements.

7. The method of claim 1, wherein transmitting, at the second antenna, the second signal comprises transmitting, at the second antenna, the second signal via the second wireless communications protocol, the second wireless communications protocol different than the first wireless communications protocol.

8. A method comprising:
   receiving, at a first antenna, a first signal associated with a first wireless communications protocol;
   processing, with at least one processing element associated with the first wireless communication protocol, the first signal to generate a second signal associated with a second wireless communications protocol, wherein processing the first signal to generate the second signal comprises:
   allocating a first set of processing elements to process the first signal based on a first instruction set associated with the first wireless communications protocol; and
   allocating a second set of processing elements to process the second signal based on a second instruction set associated with the second wireless communications protocol;
   receiving, at the first antenna, a third signal associated with the first wireless communication protocol; and
   allocating additional processing elements to the first set of processing elements to process the third signal based on the first instruction set associated with the first wireless communications protocol, wherein allocating the additional processing elements to the first set of processing elements to process the third signal comprises reallocating a portion of the second set of processing elements to the first set of processing elements.

9. A method comprising:
receiving, at a first antenna, a first signal associated with a first wireless communications protocol;
processing, with at least one processing element associated with the first wireless communication protocol, the first signal to generate a second signal associated with a second wireless communications protocol, wherein processing the first signal to generate the second signal comprises:
    allocating a first set of processing elements to process the first signal based on a first instruction set associated with the first wireless communications protocol; and
    allocating a second set of processing elements to process the second signal based on a second instruction set associated with the second wireless communications protocol;
receiving, at the first antenna, a third signal associated with the first wireless communication protocol; and
allocating additional processing elements to the first set of processing elements to process the third signal based on the first instruction set associated with the first wireless communications protocol, wherein allocating the additional processing elements to the first set of processing elements to process the third signal comprises allocating a percentage of the second set of processing elements based on a processing load for the first signal and the third signal being processed at the first set of processing elements.

10. A method comprising:
receiving, at a first antenna, a first signal associated with a first wireless communications protocol;
allocating a first set of processing elements to process the first signal;
processing, with at least one processing element associated with the first wireless communication protocol, the first signal to generate a second signal associated with a second wireless communications protocol;
allocating a second set of processing elements to process the second signal;
receiving, at a third antenna, a third signal associated with a third wireless communication protocol;
determining a common communication protocol among a first device that transmitted the first signal and a second device that transmitted the third signal based on available processing elements;
allocating processing elements to the first set of processing elements to process the third signal based on the first set of processing elements having more available processing elements relative to the second set of processing elements; and
transmitting, at a second antenna, the second signal associated with the second wireless communications protocol.

* * * * *